United States Patent [19]
Yarnell et al.

[11] 3,842,248
[45] Oct. 15, 1974

[54] UTILITIES METER READOUT SYSTEM

[76] Inventors: Neil K. Yarnell, 238 N. Broadoaks, Monrovia, Calif. 91016; Leland S. Prince, 9014 Charloma Dr., Downey, Calif. 90240

[22] Filed: Aug. 17, 1972

[21] Appl. No.: 281,387

[52] U.S. Cl. ........ 235/156, 235/61.6 R, 235/61.8 R, 235/61.9 R
[51] Int. Cl. ............................................. G06f 7/39
[58] Field of Search .......... 235/156, 61.6 R, 61.8 R, 235/61.9 R

[56] References Cited
UNITED STATES PATENTS

| | | | |
|---|---|---|---|
| 3,024,991 | 3/1962 | Foote | 235/156 |
| 3,428,786 | 2/1969 | Copony et al. | 235/61.9 R |
| 3,590,220 | 6/1971 | Yokohama et al. | 235/61.9 R |

*Primary Examiner*—Malcolm A. Morrison
*Assistant Examiner*—James F. Gottman
*Attorney, Agent, or Firm*—Albert L. Gabriel

[57] ABSTRACT

A portable automatic billing and printing device which provides for an automatic calculation and printout of a customer bill for utilities such as water, gas and electricity. Register levers set to correspond to the previous and present utility meter readings actuate electrical switches to provide input signals to a small computer. Additional registers are set to correspond to computer output billing information, which is printed together with the meter reading information on a single customer bill. Switching means provide for different computer calculations for each utility billed.

16 Claims, 10 Drawing Figures

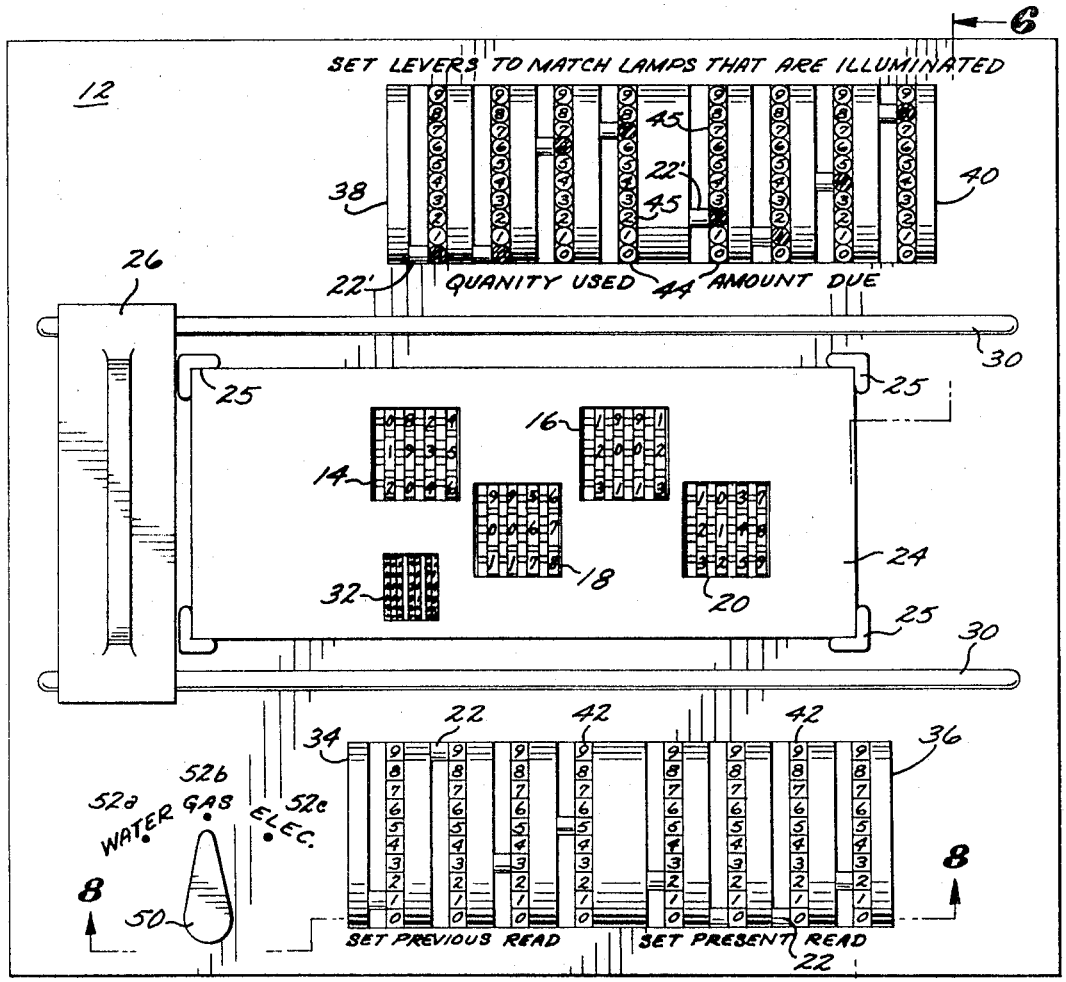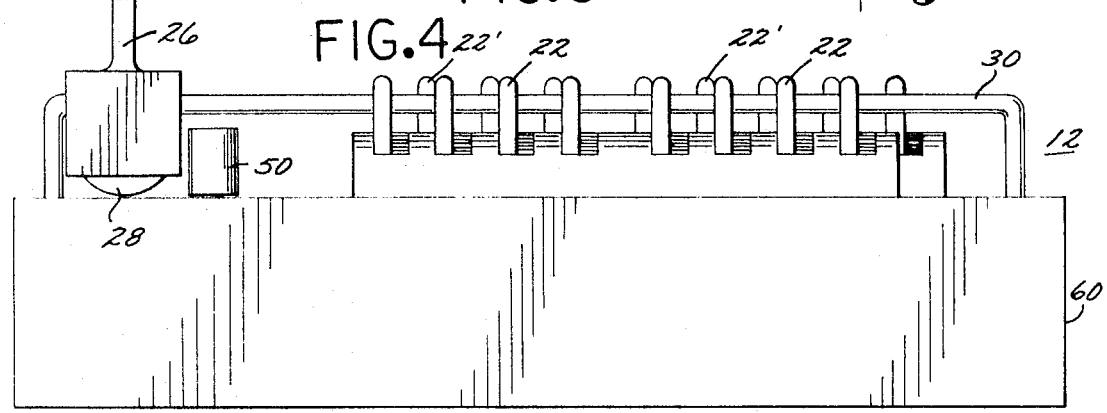

UTILITIES METER READOUT SYSTEM

BACKGROUND OF THE INVENTION

1. Field of the Invention

The invention relates to portable meter reading devices which are utilized to compute and prepare a customer utility bill at the customer location upon input of selected utility meter readings.

2. Prior Art

As is customary in utility billing procedures, the utility companies dispatch men to the business and residence locations of its customers to take periodic readings of electric, gas and water meters. These readings are then entered on worksheets and sent to the central office for computation of the customer bill for mailing to the various customer locations. Thus the total billing procedure usually takes a matter of between 4 and 7 days and involves numerous personnel at the central office to carry out the billing and mailing operation.

Although modern day telemetering methods permit an automatic reading of various utility meters followed by transmission of coded data indicative of the meter readings to the central office, these automatic readers are quite expensive to install and also entail a rental fee for use of the telephone communication lines. In addition, many of the automatic metering systems do not provide a tamper-proof device which insures accurate billing.

The use of a simple portable billing device in connection with reading utility meters is illustrated in the prior art by the Hall U.S. Pat. No. 1,087,902. Such portable billing and printing devices permit immediate savings in the expense of manually computing utility bills and printing and mailing invoices at a central office. However, the Hall device, even though portable, must be electrically connected to each utility meter in order to actuate the electromechanical mechanism. Such an arrangement is both cumbersome and time consuming. In addition, the Hall device may only be utilized for a specific utility reading and lacks the versatility to calculate complex rate charges.

SUMMARY OF THE INVENTION

It is an object of the instant invention to overcome the disadvantages of the prior art and to provide a portable meter billing apparatus which is lightweight and inexpensive and readily adapted for use in present-day meter reading procedures.

A further object of the invention is to provide a meter billing and printing device which may be utilized to compute several different utility bills for a single customer and print separate bills for each of these utilities.

A further object of the invention is to provide a simpler meter billing device which may be utilized to compute simple or complex rate charges for a given utility customer.

Yet a further object of the invention is to provide a meter billing apparatus for use in present-day meter reading procedures without the need for additional apparatus to be installed at the customer site or without the necessity of modifying present-day utility meters.

The present invention is designed to allow a single operator to read gas, electric and water meters at a given customer site and to compute and prepare bills for each of these utilities. The operator merely reads the utility meter and sets a register in the billing device corresponding to the number indicated by the meter. The operator also sets another register which is used to input the previous meter reading at the time of the previous bill. The previous meter reading is pre-printed on the customer bill which is prepared at the central office. Upon entering these two meter readings, the billing device automatically calculates and displays the total quantity used, i.e., kilowatt hours, cubic feet, etc. and the dollar amount charged for the particular quantity used. The computation of the quantity used and the dollar charge is done in a small computer which is part of the billing device and is capable of computing stepwise charges such as employed by electric utility facilities in computing kilowatt hour charges. The output of the computer is used to illuminate light sources which serve as an output display. The output display information is used by the operator to set additional registers. Both input meter reading data and computer output data are imprinted on the customer bill. The bill is prepared on a conventional imprinting roller device similar to that used to prepare credit card charges such as Bank Americard. The prepared bill contains a record of the previous meter read, the present meter read, as well as the quantity used and the total charge. The bill is made in duplicate using a standard Addressograph type card. A copy of the bill is returned to the utility office. In addition, the printed type may be optically read to facilitate utility office handling.

The operator may then prepare a second utility bill for a different utility by merely changing a selector switch on the billing device. This switch connects a separate computer programming sequence to enable the proper charge rate to be utilized in computing the customer bill for the particular utility selected.

BRIEF DESCRIPTION OF THE DRAWINGS

Other objects and advantages of the invention will become apparent from the following detailed description taken in connection with the accompanying drawings, wherein:

FIG. 1 illustrates a form of the bill which is provided by the central office;

FIG. 2 is an illustration of the bill after utilizing the device of the instant invention and contains the total billing information for delivery to the customer;

FIG. 3 is a plan view showing the top of the billing device;

FIG. 4 is a side view of the billing device of FIG. 3;

DESCRIPTION OF THE PREFERRED EMBODIMENT

Figure 5:
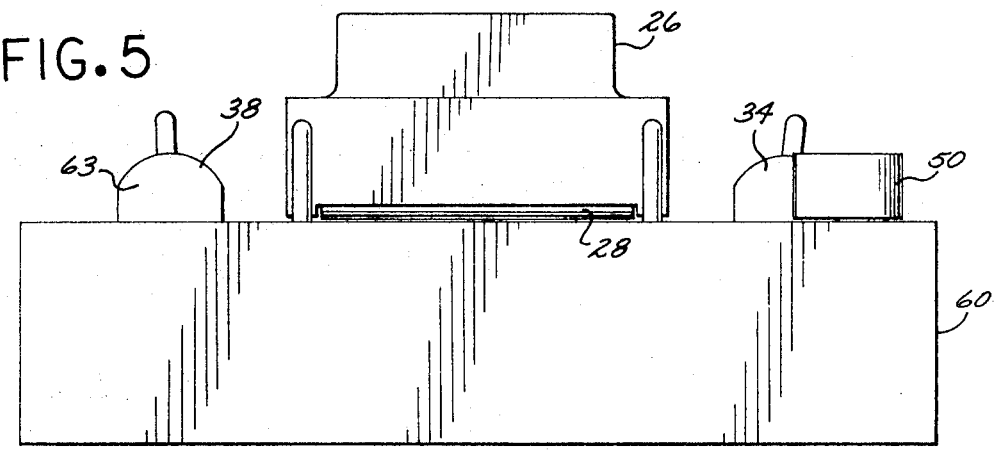
FIG. 5 is an end view of the billing device shown in FIG. 3.

FIG. 1 is an illustration of an office prepared form 2 which contains the name and address of the customer together with the meter number which is to be read by the operator. The form is pre-printed with the previous meter reading above a "previous read" zone 4. Additional areas are provided on the card which are filled in by the billing and printing device of the instant invention. These areas include a "present read" zone 6, "quantity used" zone 8 and "amount due" zone 10. FIG. 2 is an illustration of the completed bill as prepared by the billing and printing device of the instant invention. The previously empty zones 6, 8 and 10 are imprinted with numerals indicating the present meter reading together with the quantity used between the two meter readings and the dollar amount charged for the specific quantity used. The form 2 is a standard Addressograph type card having two activated sheets of paper for making duplicate copies of the bill.

FIG. 3 is a plan view illustrating the top of the billing device 12. The billing device 12 comprises four imprint registers 14, 16, 18 and 20. Registers 14 and 16 are settable by a plurality of operating levers 22 and are used to provide input information corresponding to the previous meter read and present meter read respectively. Registers 18 and 20 are operated by levers 22' and are used to provide output information corresponding to the "quantity used" and "amount due" respectively. The four imprinting or printing registers may be of a type similar to the Addressograph model 1428E. The four registers are positioned within a rigid rectangular plate 24 over which the form 2 is positioned for preparing the customer bill. Form 2 fits securely within the raised holding members 25. The printing is done by utilizing the registers in connection with an imprinting roller mechanism 26 which is similar to that used in the Bank Americard card printers. The roller mechanism 26 contains an imprinting roller 28 as is best illustrated in FIG. 4. The rolling mechanism 26 is slidably positioned on rails 30 for transverse movement across the imprint registers 14, 16, 18 and 20. Plate 24 also contains a six digit stylus data register 32 which is utilized in printing the meter reading date on the bill together with the other billing information.

The billing device 12 is also provided with four indicator-registers 34, 36, 38 and 40 which are used to provide a visual indication of the lever settings 22 and 22' corresponding to the position of printing registers 14, 16, 18 and 20 respectively. The indicator-registers 34 and 36 are each provided with columns of numerals 42 which provide a visual indication of the setting of the levers 22 and correspond to the numerical value indicated by the printing registers 14 and 16 respectively. Indicator-registers 28 and 40 contain columns 44 of indicator light sources 45 which may, for example, be light emitting diodes. The columns 44 of light sources 45 are used to indicate the output data which is to be printed in zones 8 and 10 of form 2. Levers 22' are set adjacent to the energized light sources 45 in each of the columns 44. The light sources have numerical indicia thereon for ease of setting the levers. Thus, the numerals on the printing registers 18 and 20 correspond to the settings of the levers 22' which are placed adjacent to the energized light sources in columns 44.

The billing device 12 used for calculating and printing comprises a utility selecting switch 50 which may be set to a plurality of positions used in computing a water, gas or electric bill. The switch 50 may, for example, be a wafer switch having three positions 52a, 52b and 52c corresponding to water, gas and electric settings respectively.

FIG. 4 is a side view of the billing device 12. The imprint roller 28 is clearly illustrated within the imprint roller mechanism 26.

FIG. 5 is an end view of the billing device 12 showing the imprint roller mechanism and the indicator-registers. As seen in FIGS. 4 and 5, the billing device 12 comprises a lower housing member 60 which contains the printing registers 14, 16, 18 and 20 together with the mechanical and electrical components as described below.

Figure 6:
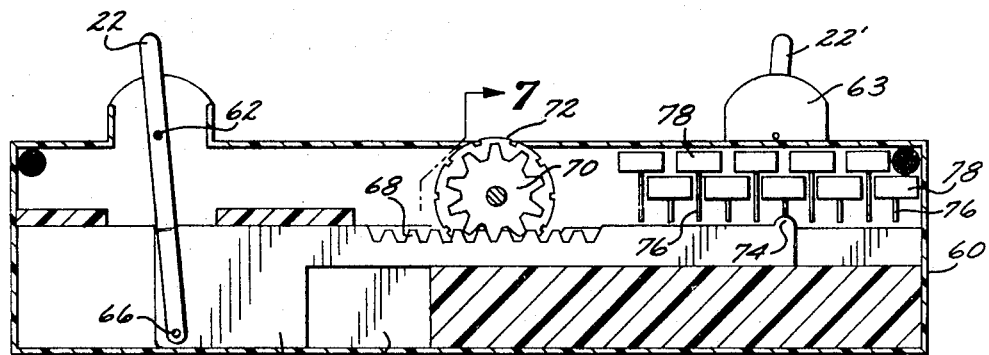
FIG. 6 is a sectional view of the billing device taken along lines 6—6 of FIG. 3 and illustrates the imprint register means and register sensor means.

The simple rack and gear mechanism of the registers is illustrated in FIG. 6 which is a cross sectional view of the billing device 12 taken along lines 6—6 of FIG. 3. Lever 22 is pivotally mounted about pin 62 which is secured to an end of a register housing member 63. An end of the lever 22 is attached to a rack 64 by means of a pin 66. Rack 64 contains a plurality of teeth 68 which are positioned to engage a gear member 70. Gear member 70 is rigidly attached to a wheel 72 of the imprint register 16. The end of rack 64 has a raised projection 74 which engages plungers 76 of reed relays 78. Thus, the position of the rack 64 is electrically sensed by means of the movement of plungers 76 actuating reed relays 78. Rack 64 is slidably positioned by a guide member 80 which may be fabricated of nylon to reduce surface friction.

Although FIG. 6 illustrates only one lever 22 and its associated rack 64, gear 70, wheel 72, raised projection 74 and a plurality of reed relays 78, it is to be understood that each lever 22 within the indicator-registers 34 and 36 is mechanically and electrically connected in a similar manner as described above. In addition, levers 22' which are part of the indicator-registers 38 and 40 are also connected mechanically in a similar fashion as described above; however, no electrical sensors are provided for the rack positions in indicator-registers 38 and 40. Since the indicator-registers 38 and 40 are used as outputs from the computer means, it is only necessary to energize appropriate light sources 45 in the columns 44.

Figure 7:
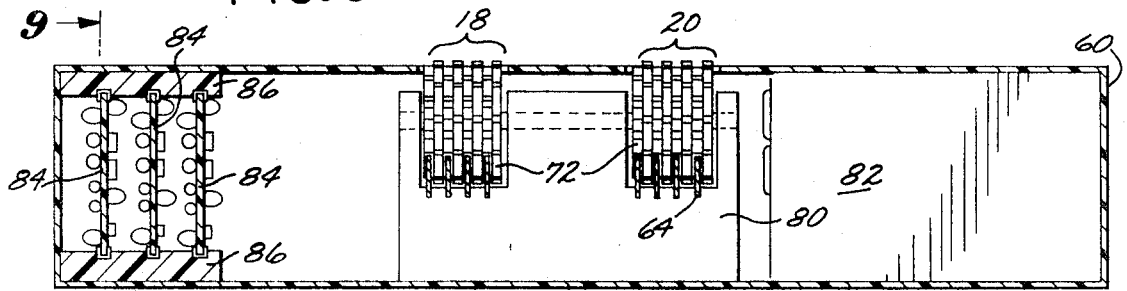
FIG. 7 is a longitudinal cross sectional view of the billing device taken along lines 7—7 of FIG. 6.

FIG. 7 is a longitudinal cross sectional view of the billing device taken along lines 7—7 of FIG. 6. Only the lower housing section 60 is illustrated for simplicity. As can be seen in FIG. 7, the billing device contains a chargeable battery 82 whcih is used to provide all the electrical power for the apparatus. Also illustrated in FIG. 7 are a plurality of printed circuit boards 84 which are used to house the computer electronics. Each circuit board is securely positioned within support members 86.

Figure 8:
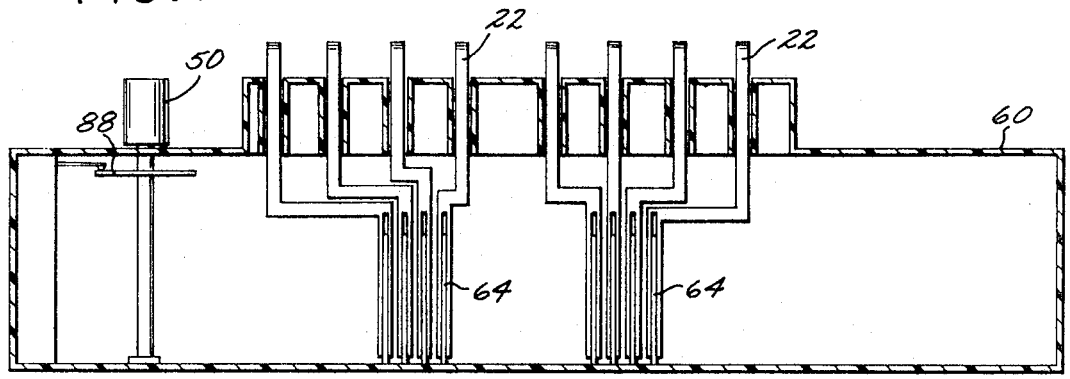
FIG. 8 is a sectional view of the billing device taken along lines 8—8 of FIG. 3.

FIG. 8 is a longitudinal cross sectional view of the billing device 12 taken along line 8—8 of FIG. 3. FIG. 8 illustrates the method of connecting the levers 22 to the racks 64. Also illustrated in FIG. 8 is the utility selector switch 50 which has a wafer member 88 rotatable to each of the three electrical switch positions.

Figure 9:
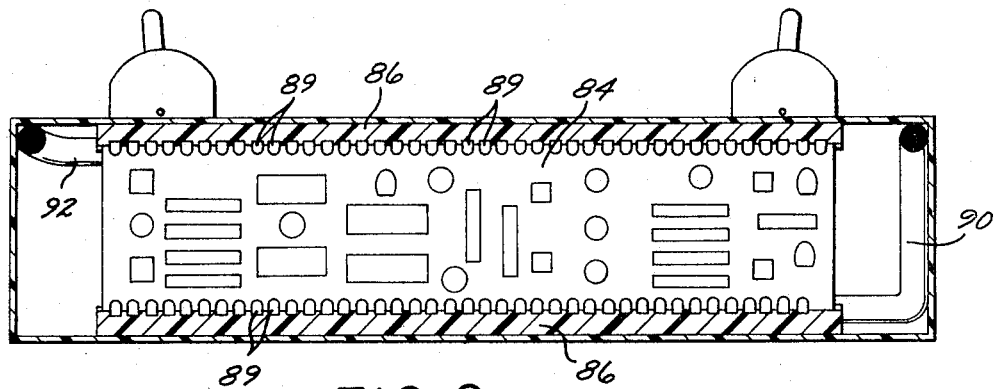
FIG. 9 is a sectional view of the billing device taken along lines 9—9 of FIG. 7 and illustrates the printed circuit boards containing the electrical circuitry.

FIG. 9 is a longitudinal cross sectional view of the billing device taken along line 9—9 of FIG. 7. A printed circuit board is illustrated together with electrical contact terminals 89. Also illustrated in FIG. 9 is a wire cable 90 which connects the reed relay sensors 78 to the printed circuit board electronics via terminals 89. Cable 92 is an output cable which connects the printed circuit board to the light sources 45 in columns 44 of the indicator registers 38 and 40.

Figure 10:
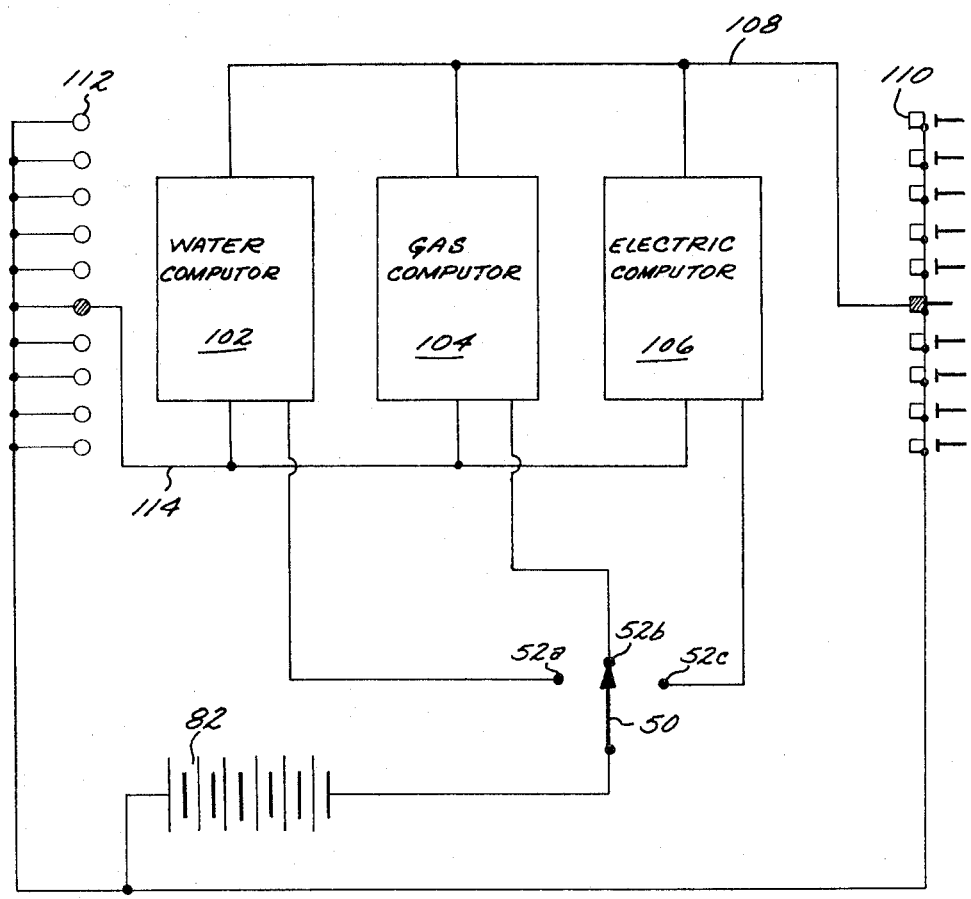
FIG. 10 illustrates a schematic of the overall electrical circuitry used in the billing device.

A block diagram of the system electronics is illustrated in FIG. 10. Selector switch 50 is rotatable to any one of the three terminal positions 52a, 52b or 52c. The selection of 52b, for example, connects the computer circuitry associated with the gas bill computation. Each of the computer circuits 102, 104 and 106 is connected to the imprint register sensors, i.e., the reed relays, by means of connecting lines 108. Sensor contact terminals 110 actually comprise eight rows of ten terminals to correspond to the 80 reed relays associated with the indicator-registers 34 and 36. The terminals 110 are connected to the input of the computer electronics 102, 104, and 106 and provide signals indicative of the previous meter read and the present meter read. The computer electronics then calculates the quantity used and the cost to the customer. The output of the computer electronics is fed to a plurality of indicator light source terminals 112 by way of connecting lines 114. Terminals 112 actually represent eight columns of 10 terminals each, and correspond to the eighty indicator light sources associated with the columns 44 of indicator-registers 38 and 40. Lines 114 and 108 actually connect to each of the terminals 112 and 110 respectively, and the single line in the drawing illustrates the fact that only one light source per column 44 and only one reed relay per column 42 is actuated at a given time.

The computer electronics may be designed to calculate a fixed rate of charge for a given quantity of utility used or may be designed to calculate more complex, step-wise rates as is common in electrical utility billing procedures. Thus, for example, two or three separate rates may be utilized in computing the customer electric bill depending upon the total amount of electric power used within certain pre-established limits.

The computer circuits illustrated by indicia 102, 104 and 106 are housed on the printed circuit boards 84. The circuit design may incorporate any conventional logic circuitry for carrying out the basic arithmetic operations for adding/subtracting and multiplying/dividing. The circuitry generally need only be sufficient to carry out a maximum of 26 elementary computer operations since the computations involved are not very lengthy. Thus the three circuit boards shown in FIG. 7 are sufficient to house all the computer logic.

OPERATION

The operation of the instant invention is most easily understood by reference to FIGS. 1–3. The operator prepares a bill by selecting a form 2 which is pre-printed with the customer name, address and previous meter read for a particular utility. A gas utility bill is illustrated in FIGS. 1 and 2. Th operator first sets the previous meter reading in the indicator-register 34 by positioning levers 22 adjacent to the corresponding numbers of the previous meter read. In the present example, the previous meter reading is 1935. The movement of levers 22 automatically results in a corresponding movement of the wheels 72 of imprinting register 14. As seen in FIG. 6 the movement of lever 22 causes the corresponding rack 64 to move forward or backward. The movement of rack 64 causes the gear 70 and wheel 72 of the imprinting registers to rotate and expose different numerals through the openings in plate 24. Thus, when the operator moves the levers 22 to the corresponding numbers in columns 42 of the indicator-register 34, the corresponding numbers also appear on imprinting register 14. The operator then checks to make sure that the utility selector switch 50 is positioned at the appropriate gas utility terminal 52b. The operator then reads the present gas meter which is identified by the meter number 8971 as appearing in the right hand corner of form 2. The operator then sets the present meter read in the indicator-register 36 by moving levers 22 adjacent to the corresponding numbers in columns 42. The movement of levers 22 of indicator-register 36 causes the wheels 72 of the imprint register 16 to rotate to corresponding numerical positions as explained above.

The electronics is designed such that the setting of the present meter read into the indicator-register 36 automatically actuates the gas computer circuitry to compute the output data. The quantity used and the amount due, are displayed by the light sources 45 in columns 44 of the indicator-registers 38 and 40. In the instant example, the output data is represented by 67 cubic feet for the quantity used and $21.48 for the amount due. In order to produce the final output bill, the operator merely moves the levers 22' adjacent to the energized light sources 45 in columns 44 of the indicator-registers 38 and 40. The movement of levers 22' causes the wheels 72 of the associated imprint registers 18 and 20 to take up corresponding positions as that indicated by the light sources. The operator then sets the date register 32 and inserts the form 2 within the holding members 25 and over the plate 24. Roller mechanism 26 is now moved across the plate 24 secured by guide rails 30. Imprint roller 28 depresses the form 2 down against the imprint registers 14, 16, 18 and 20 as well as the date register 32. The form 2 is consequently imprinted with the numerals shown in the wheels 72 of the imprint registers. The bill is now complete. The operator merely gives the original copy to the customer and retains the copy for the central office records.

Additional meter readings and billings may now be conducted in a similar fashion. If the operator, for example, wishes to read the electrical meter, he merely changes the selector switch 50 to the electrical position 52c. Again the operator sets the previous electrical meter read in the indicator-register 34 and the present meter read in indicator-register 36. The calculated quantity used and the total amount due are now displayed by the indicator light sources or LED's in rows 44 of the indicator-registers 38 and 40 respectively. The operator then moves levers 22' to positions adjacent to the energized light sources, and the final bill is printed in the manner as described above.

The billing device 12 may be provided with an automatic timing device such that the light sources 45 are deenergized after a fixed delay of, for example, 30 seconds. Alternately the light sources may be manually reset by the operator.

While a particular embodiment of the invention has been shown and described, modifications may readily be made by those skilled in the art, and it is intended that the claims cover any such modification which fall within the spirit and scope of the invention.

We claim:
1. A calculating and printing apparatus for preparing a print-out said apparatus having computing means for calculating output data signals and comprising:
   a housing, a plurality of input register means within said housing each input register means having indicia bearing projections for printing input data on said print-out, a first plurality of register setting means connected to each of said plurality of input register means for positioning various ones of said projections, a plurality of output register means within said housing each output register means having indicia bearing projections for printing output data on said print-out, a second plurality of register setting means connected to each of said plurality of output register means for positioning various ones of said projections, means for sensing the position of said input register means for providing input data signals to said computing means, and means for indicating said output data signals from said computing means.

2. A calculating and printing apparatus as recited in claim 1 wherein said second plurality of register setting means is positioned adjacent said indicating means.

3. A calculating and printing apparatus as recited in claim 2 wherein said second plurality of register setting means comprises levers and said indicating means comprises groups of light sources.

4. A calculating and printing apparatus as recited in claim 3 wherein each group of light sources is positioned adjacent a lever and wherein each lever is movable for positioning in one-to-one correspondence with light sources of said adjacent group.

5. A calculating and printing apparatus as recited in claim 1 wherein said input register means comprises a first plurality of input imprint registers corresponding to a first input parameter and a second plurality of input imprint registers corresponding to a second input parameter.

6. A calculating and printing apparatus as recited in claim 5 wherein said output register means comprises a first plurality of output imprint registers corresponding to a first output data signal from said computing means and a second output imprint register corresponding to a second output data signal from said computing means.

7. A calculating and printing apparatus as recited in claim 6 further comprising imprint roller means adapted on said housing for transverse motion across each of said imprint registers.

8. A calculating and printing apparatus as reicted in claim 1 further comprising switching means connected to said computing means for selecting one of a plurality of predetermined calculating sequences of said computing means.

9. A calculating and printing apparatus as reicted in claim 1 wherein each of said plurality of input and output register means comprise a wheel having indicia bearing projections thereon and each of said first and second plurality of register setting means comprises:
a lever extending through said housing,
a rack within said housing said rack connected to one end of said lever and having teeth thereon, and
a gear connected to said register wheel and positioned for engagement with the teeth of said rack.

10. A calculating and printing apparatus as recited in claim 9 wherein said sensing means are positioned adjacent said rack for determining the position thereof.

11. A calculating and printing apparatus as recited in clam 10 wherein said sensing means comprises reed relays.

12. A portable printing and billing apparatus for preparing a customer utility bill having computing means for calculating utility costs data and utility quantity data from input signals indicative of utility meter readings comprising:
input printing registers having a plurality of settings for printing said customer bill with numerical indicia corresponding to meter readings,
register sensing means responsive to said input printing registers for providing electronic input signals to said computing means,
means connected to said computing means for indicating the utility costs data and utility quantity data calculated by said computing means,
output printing registers for printing said customer bill with said calculated utility costs data and quantity data, and
means for positioning said output printing registers said positioning means adjacent said indicating means.

13. A calculating and printing apparatus as recited in claim 12 further comprising switching means connected to said computer means for selecting one of a plurality of predetermined programming sequences of said computer means.

14. A calculating and printing apparatus as recited in claim 12 wherein said indicating means comprises groups of light sources and said positioning means comprises levers corresponding to each of said groups, said levers movable for positioning adjacent the light sources of said corresponding groups.

15. A method of preparing a print-out by a calculating and printing device comprising the steps of:
manually setting a first numerical printing register on said device to correspond to a first meter reading, manually setting a second numerical printing register on said device corresponding to a second meter reading,
causing said device to sense the numerical settings of said first and second printing registers to generate signals and applying the same as input meter readings to an electronic computing means,
causing said computing means to subtract the smaller numerical value corresponding to the numerical setting on said first and second printing registers from the larger numerical value of said printing registers for providing quantity output data,
causing said computing means to multiply said quantity output data by a rate constant for providing cost output data,
automatically displaying output data of said computing mans by causing the same to energize a plurality of groups of light sources,
manually setting at least one additional numerical printing register by moving printing register actuating levers positioned adjacent said groups of light sources, and
manually printing said print-out with numerical indicia from said first, second and additional printing registers.

16. A method of preparing a print-out by a calculating and printing device as recited in claim 15 further comprising the steps of:

manually selecting one of a plurality of rate constants for said computing means, and manually setting a date register to print the date on said print-out.

* * * * *